United States Patent
Cortes et al.

(10) Patent No.: US 10,538,033 B2
(45) Date of Patent: Jan. 21, 2020

(54) VIRTUAL BUILD BEDS

(71) Applicant: Hewlett-Packard Development Company, L.P., Houston, TX (US)

(72) Inventors: Sebastia Cortes, Barcelona (ES); Jun Zeng, Sunnyvale, CA (US); Xavier Vilajosana, Barcelona (ES)

(73) Assignee: Hewlett-Packard Development Company, L.P., Spring, TX (US)

( * ) Notice: Subject to any disclaimer, the term of this patent is extended or adjusted under 35 U.S.C. 154(b) by 194 days.

(21) Appl. No.: 15/515,628

(22) PCT Filed: Sep. 30, 2014

(86) PCT No.: PCT/US2014/058158
§ 371 (c)(1),
(2) Date: Mar. 30, 2017

(87) PCT Pub. No.: WO2016/053263
PCT Pub. Date: Apr. 7, 2016

(65) Prior Publication Data
US 2017/0305067 A1     Oct. 26, 2017

(51) Int. Cl.
*B29C 64/393* (2017.01)
*B33Y 10/00* (2015.01)
(Continued)

(52) U.S. Cl.
CPC ............ *B29C 64/393* (2017.08); *B33Y 10/00* (2014.12); *B33Y 50/02* (2014.12);
(Continued)

(58) Field of Classification Search
CPC ....... B33Y 10/00; B33Y 52/02; B29C 64/393; B29C 64/153; G05B 19/0426; G06F 21/52; G06F 21/6209
(Continued)

(56) References Cited

U.S. PATENT DOCUMENTS

| | | | |
|---|---|---|---|
| 1,021,942 A * | 4/1912 | Murray | H04L 17/22 |
| | | | 178/27 |
| 7,353,252 B1 | 4/2008 | Yang et al. | |

(Continued)

FOREIGN PATENT DOCUMENTS

EP     1031392     8/2000
JP     2009-512060   3/2009
(Continued)

OTHER PUBLICATIONS

WU_2014 ( Cloud-based design and manufacturing: A new paradigm in digital manufacturing and design innovation, Available online Aug. 4, 2014 https://doi.org/10.1016/j.cad.2014.07.006).*

(Continued)

*Primary Examiner* — Brian S Cook
(74) *Attorney, Agent, or Firm* — HP Inc. Patent Department (57) ABSTRACT

A method and apparatus partition a AM build bed of a AM unit into a first virtual build bed and a second virtual build bed. The first virtual build bed is assigned to a first user while the second virtual build bed assigned to a second user. A first digital file for a first object to be generated in the first virtual build bed is received from the first user. A second digital file for a second object to be generated in the second virtual build bed is receive from the second user. Output signals are transmitted to the AM unit to generate the first object in the first virtual build bed and the second object in the second virtual build bed during a build cycle.

19 Claims, 5 Drawing Sheets

(51) Int. Cl.
  *B33Y 50/02* (2015.01)
  *G05B 19/042* (2006.01)
  *G06F 21/52* (2013.01)
  *G06F 21/62* (2013.01)

(52) U.S. Cl.
  CPC ......... *G05B 19/0426* (2013.01); *G06F 21/52* (2013.01); *G06F 21/6209* (2013.01); *G05B 2219/49023* (2013.01); *G06F 2221/033* (2013.01); *G06F 2221/2141* (2013.01)

(58) Field of Classification Search
  USPC .......................................................... 703/7
  See application file for complete search history.

(56) References Cited

U.S. PATENT DOCUMENTS

| | | | |
|---|---|---|---|
| 7,833,001 | B2 | 11/2010 | Silverbrook |
| 2006/0052891 | A1 | 3/2006 | Ikeda et al. |
| 2008/0247635 | A1 | 10/2008 | Davis et al. |
| 2009/0139078 | A1* | 6/2009 | Fruth ................ G05B 19/4069 29/592 |
| 2011/0190446 | A1 | 8/2011 | Matsui |
| 2011/0293771 | A1 | 12/2011 | Oberhofer et al. |
| 2012/0092724 | A1 | 4/2012 | Pettis |
| 2012/0109591 | A1* | 5/2012 | Thompson ............... G06F 17/50 703/1 |
| 2014/0058959 | A1 | 2/2014 | Isbjornssund et al. |
| 2014/0074274 | A1* | 3/2014 | Douglas ................. B33Y 50/02 700/105 |

FOREIGN PATENT DOCUMENTS

| | | |
|---|---|---|
| JP | 2011-019044 | 8/2011 |
| KR | 10-1400875 | 8/2014 |

OTHER PUBLICATIONS

Lehner_2012 (3D Printing Multiple Objects at Once, Youtube video downloaded from https://www.youtube.com/watch?v=E6E8nReqgKo published on Dec. 21, 2012.).*
Aficio_2012 (Storing Documents in the Hard Disk and Printing Them, downloaded from http://support.ricoh.com/bb_v1oi/pub_e/oi_view/0001043/0001043157/view/printer/int/007 ... Dated 2012).*
Teng_2011 (Resource allocation and scheduling models for cloud computing, HAL archives, Jan. 2012).*
WU_2014 ( Cloud-based design and manufacturing: A new paradigm in digital manufacturing and design innovation, Available online Aug. 4, 2014 https://doi.org/10.1016/j.cad.2014.07.006) (Year: 2014).*
Lehner_2012 (3D Printing Multiple Objects at Once, Youtube video downloaded from https://www.youtube.com/watch?v=E6E8nReqgKo published on Dec. 21, 2012.). (Year: 2012).*
Aficio_2012 (Storing Documents in the Hard Disk and Printing Them, downloaded from http://support.ricoh.com/bb_v1oi/pub_e/oi_view/0001043/0001043157/view/printer/int/007 ... Dated 2012). (Year: 2012).*
Teng_2011 (Resource allocation and scheduling models for cloud computing, HAL archives, Jan. 2012). (Year: 2011).*
Bell_1920 (Bell, J. Printing Telegraph Systems 8th Midwinter Convention of the American Institute of Electrical Engineers, New York , Feb. 19, 1920 (Year: 1920).*
Print_Services_TB_v10.4_2005 (Print Services, Apple, 2005). (Year: 2005).*
EP Search Report for 14903285.6 dated Apr. 10, 2018.
China Office Action for 20140082228.8 dated Jun. 11, 2018.
Hiemenz, Joe, "3D printing with FTM, How IT Works", Stratasys White Paper,http://www.stratasys.com/~/media/Main/Secure/White%20Papers/Rebranded/SSYS Apr. 28. 2014.

* cited by examiner

VIRTUAL BUILD BEDS

BACKGROUND

Additive manufacturing systems, such as three-dimensional (3-D) printers, employ an additive manufacturing process to create objects from plastic or other materials. Such additive manufacturing (AM) systems include a build bed or build volume in which one or more objects are generated during a single build cycle. Current practice often involves an operator loading digital files containing digital representations of each of the objects to be generated during a build cycle. The digital representations of the objects contained in a digital file are digitally sliced into layers. During the build cycle, the AM system forms such layers upon one another to generate the three-dimensional objects.

DETAILED DESCRIPTION OF EXAMPLES

Figure 1:
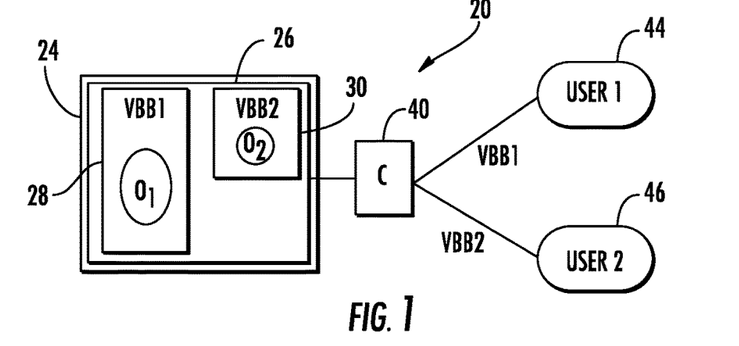
FIG. 1 is a schematic diagram of an example additive manufacturing system.

FIG. 1 schematically illustrates an example AM system 20. As will be described hereafter, AM system 20 facilitates use of a single build cycle of a AM build bed by multiple users. As a result, utilization, efficiency and throughput of AM system 20 may be enhanced. AM system 20 comprises additive manufacturing (AM) unit 24 and controller 40.

AM unit 24 (schematically shown) comprise a device which forms parts or objects through an additive process. AM unit 24 comprises an AM build bed 26 that comprises a workspace or build volume in which parts or objects are built or formed in an additive fashion during a generation, fabrication or build cycle. A build cycle starts from laying the 1st layer of build material when the build volume of bed 26 is completely empty, to the time when the maximum number of layers in the build material have been formed. The maximum number of layers corresponds to either the height of build volume of bed 26 or the maximum height of all the objects in this batch, whichever is smaller. In another implementation, a build cycle is a duration of time during which objects are generated within the build volume of build bed 26 without any of the objects being removed from the build volume. The generation of an object refers to the sequential solidification or formation of layers of build material to form the three-dimensional shape of the object, in contrast to or as compared to preparing a digital file of an object for generation by digitally slicing the object. In one implementation, AM build bed 26, sometimes also referred to as a build volume or build tray, comprises a continuous uninterrupted volume containing build material, such as a powder, portions of which are selectively solidified, layer by layer, to additively generate three dimensional parts or objects. After a first layer of the part or object has been generated, the AM build bed is lowered and a new layer of build material is provided above the uppermost first layer of the part or object, wherein portions of the new layer of build material are selectively solidified and may join with previously solidified portions of the part or object. In one implementation, such solidification is carried out through a laser sintering process in which a laser or more than one laser is selectively applied to the build material within bed 26 to melt and fuse the build material, layer by layer, into a solid structure forming the part or object being printed. In another implementation, a catalyst, reactant or adhesive is selectively applied, such as with an inkjet printer, to the build material to convert portions of the build material, layer by layer, into a solid structure forming the part or object being generated. In yet other implementations, solidification of the build material may be carried out, layer by layer, using other powder or other material solidification technologies.

In yet other implementations, AM unit 24 forms three-dimensional objects or parts using other additive processes or technologies. For example, in other implementations, in lieu of selectively solidifying the build material to form adjacent layers to form a three-dimensional part of product, wherein the un-solidified build material or powder serves as a support for any overlying solidified layers, sacrificial layers may be formed or printed so as to support subsequently formed and overlying non-sacrificial layers. Such sacrificial layers may be formed from materials that are subsequently easily separated, removed or chemically dissolved from the non-sacrificial layers which form the final part or object. In one implementation, AM unit 24 comprises a 3-D printer. In other implementations, AM unit 24 comprise other types of additive manufacturing units.

Controller 40 comprises a processing unit and associated program logic which direct the allocation of build jobs to AM build bed 26. In one implementation, controller 40 is embedded in or as part of AM unit 24. In yet another implementation, controller 40 is run on a server connected to AM unit 24. In still other implementations, controller 40 is provided by a private data center that manages a fleet of AM units, such as a fleet of 3-D printers, or inside a network. For purposes of this application, the term "processing unit" shall mean a presently developed or future developed processing unit that executes sequences of instructions contained in a memory. Execution of the sequences of instructions causes the processing unit to perform steps such as generating control signals. The instructions may be loaded in a random access memory (RAM) for execution by the processing unit from a read only memory (ROM), a mass storage device, or some other persistent storage. In other embodiments, hard wired circuitry may be used in place of or in combination with software instructions to implement the functions described. For example, controller 40 may be embodied as part of one or more application-specific integrated circuits (ASICs). Unless otherwise specifically noted, the controller is not limited to any specific combination of hardware circuitry and software, nor to any particular source for the instructions executed by the processing unit.

In one implementation, controller 40 additionally directs the operation of AM unit 24. In implementations where parts or objects are formed by selectively solidifying build material within bed 26, controller 40 may additionally direct the supply and distribution of the build material and directs the selective solidification of the build material, layer by layer, to form the parts or objects being printed. In the example implementation, the associated program logic of controller 40, embodied as a non-transitory computer-readable medium, directs the processor to carry out the example method 100 illustrated in FIG. 2.

Figure 2:
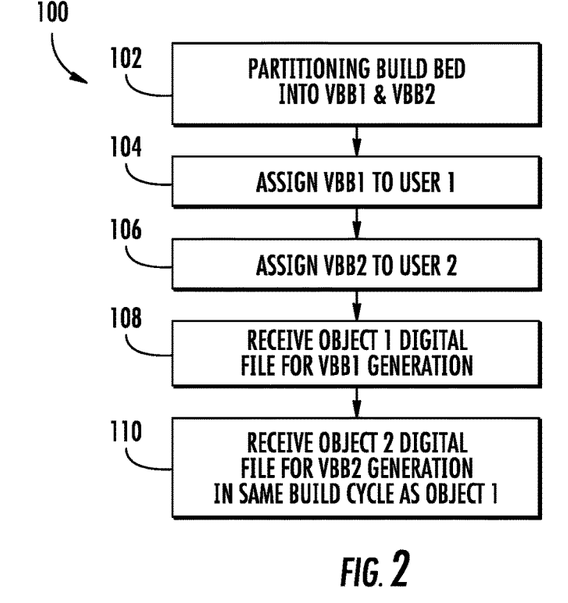
FIG. 2 is a flow diagram of an example additive manufacturing method.

As indicated by block 102 in FIG. 2, controller 40 partitions build bed 26 into a plurality of different virtual build beds, such as illustrated virtual build bed 28 and virtual build bed 30. Virtual build beds 28, 30 comprise three-dimensional additive manufacturing zones or sub-volumes of the volume forming build bed 26. Each virtual build bed 28, 30 serves as a virtual outer container for objects or parts to be built. In one implementation, virtual build beds 28, 30 comprise sub-volumes of build bed 26 extending above a single movable platform which raises and lowers a volume of build material and those portions solidified in the build material. Such beds 28, 30 are virtual in that such beds 28, 30 are not separated or divided by any physical walls or structures, but are different virtually defined volumes.

Figure 3:
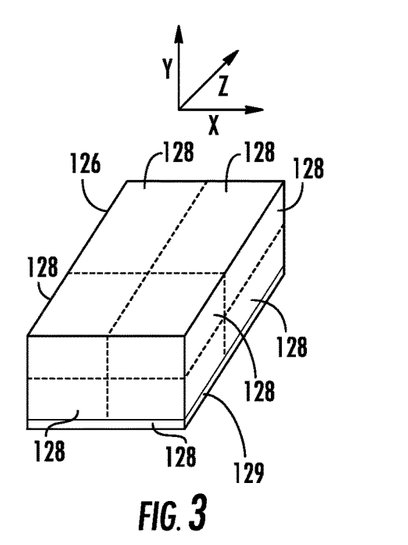
FIG. 3 is a perspective view of an example build bed partitioned into example virtual build beds.

Such virtual build beds 28, 30 may have a variety of different sizes, shapes and relative positions within build bed 26. FIG. 3 is a perspective view of an example AM build bed 126 that has been partitioned into eight virtual build beds 128. As shown by FIG. 3, such virtual build beds comprise three-dimensional building zones that are located side-by-side, above and below one another. Each virtual build bed 128 comprises a distinct three-dimensional volume in which three-dimensional objects may be built or generated. In implementations where the AM unit generates three-dimensional objects by selectively solidifying, layer by layer, a build material, the build bed 126 is supported by an underlying movable platform 129 which is raised and lowered by an actuator, such as a motor, electric solenoid, hydraulic pump or pneumatic pump, during printing of three-dimensional objects within virtual build beds 128.

Although AM build bed 126 is illustrated as being rectangular in shape, in other implementations, AM build bed 126 may have other shapes depending upon the shape of the walls or container containing the printing material and the shape of the underlying platform 129. Although each of virtual build beds 128 shown in FIG. 3 are illustrated as being rectangular or box-shaped, in other implementations, controller 40 may partition printer build bed 126 into virtual build beds 128 having other shapes and other sizes. For example, in one implementation, controller 40 may partition build bed 126 into multiple virtual build beds 128, wherein one of the virtual build bed 128 has a shape of a cylinder, sphere, pyramid or any other three-dimensional shape. In one implementation, controller 40 may partition build bed 126 such that some of virtual build beds 128 nest within one another. For example, in one implementation, controller 40 may partition build bed 126 into a first virtual build bed 128 having an annular shape, the shape of a donut, or a U-shape or V-shape. Controller 40 may also partition build bed 126 into a second virtual build bed 128 which is nested within the annular shape, the U-shape or the V-shape of the first virtual build bed. In one implementation, controller 40 may partition build bed 126 into multiple L-shaped virtual build beds which partially wrap around one another or nest against one another to reduce the occurrence of gaps. In yet other implementations, controller 40 partitions build bed 26 into more complex irregular shaped virtual build beds which are interfitted with respect to one another. By compactly arranging virtual build beds 128 into the combined volume of build bed 126, controller 40 may enhance throughput and efficiency of build bed 126 during a single build cycle.

In one implementation, controller 40 utilizes predefined sizes and shapes for defining different virtual build beds partitioned from printer build bed 26. In another implementation, controller 40 automatically defines the shape and size of each virtual build bed based upon the size and shape of the objects to be generated as received from each user. For example, in one implementation, a user may submit a request for generating an object or a collection of objects. Controller 40 analyzes the size, shape and configuration of such objects to determine the appropriate size for the virtual build bed, wherein controller 40 partitions build bed 26 into a virtual build bed of the appropriate size and shape. In another implementation, controller 40 provides each user with an interface that allows each user to define the shape and size of its virtual build bed. For example, in one implementation, a user or customer may contract for a particularly sized virtual build bed. In one implementation, such build beds are contracted or sold on a per unit volume basis. In another implementation, virtual build beds have predefined sizes with predefined contract prices. In such implementations, controller 40 may selectively schedule and combine the user-defined virtual build bed with other virtual build beds of other users so that the object of the different virtual build beds are manufactured during the same build cycle of build bed 26 so as to increase utilization of each of the build volumes of the build bed 26 during each additive manufacturing build cycle.

As indicated by blocks 104 and 106 of FIG. 2, once controller 40 has partitioned build bed 26 into virtual build beds 28, 30, controller 40 assigns or licenses temporary ownership of, or different temporary rights or access to, virtual build beds 28, 30 to different users 44, 46. In one implementation, users 44, 46 are remote from AM unit 24 such that users 44, 46 communicate with controller 40 and AM unit 24 across a local area network or a wide area network, such as the Internet, in a wired or wireless fashion. In one implementation, users 44, 46 are located remote from one another. In one implementation, users 44, 46 comprise persons or entities which are associated with one another, such as persons or entities which are part of the same company or organization. In another implementation, users 44, 46 comprise persons or entities which are wholly unrelated to one another and not associated with one another. Although FIG. 1 illustrates two such users 44, 46 receiving ownership, access or rights to two virtual build beds 28, 30, in other implementations, controller 40 partitions build bed 26 into more than two virtual build beds and assigns or licenses temporary ownership, access or rights to the more than two virtual build beds to more than two users.

In one implementation, controller 40 comprises a memory or database, local with respect to AM unit 24, local with respect to controller 40 and/or remote with respect to both printer 24 and controller 40. In such an implementation, controller 40 records each of the assignments of the different virtual build beds for AM build bed 26 in each of different ongoing or future build cycles for printer 24. In such implementations, the configurations of different virtual build beds in different build cycles are different to enhance efficiency and throughput of AM build bed 26 during the different build cycles. In one implementation, controller 40 analyzes the size, shape or configuration of future scheduled virtual build beds and allocates the different virtual build beds amongst different build cycles for build bed 26 to enhance a degree to which the available volume of build bed 26 is utilized in the multiple build cycles and to provide real-time load-balancing. In one implementation, controller 40 schedules AM build jobs, such as 3-D print jobs, in the different virtual build beds of the different build cycles from the multiple different users. In another implementation, controller 40 may also account for the service level agreement associated with a virtual build bed to determine the scheduling priority, for example, a virtual bed contains jobs that are urgent, due soon and/or associated with hefty fines if delivered late.

In one implementation, controller 40 markets access, ownership or rights to use portions of printer build beds 26 during different build cycles, wherein controller 40 partitions build bed 26 into different virtual build beds based upon such marketing results. For example, in one application, controller 40 directs operation of a website upon which different users may view and purchase access to different amounts or volumes of space, different virtual build beds, in build bed 26 at different times. In one implementation, controller 40 assesses different charges to different users based upon build or manufacturing time flexibility. For example, controller 40 charges those users that have restricted windows of time in which their acquired virtual build bed is to be generated at a higher rate as compared to those users that have more flexible windows of time in which their acquired build bed is to be generated. The lower rate assessed to those users having a more flexible window of time for virtual build bed printing rewards such flexibility because controller 42 is able to shift the more flexible virtual build beds amongst different build cycles at different times to enhance percent utilization of the total volume of printer build bed 26 amongst the different build cycles. By encouraging greater flexibility for the generation of an object or objects in a particular virtual build bed, controller 40 increases a likelihood that differently configured virtual build beds amongst different build cycles may be more compactly arranged, nested or inner fitted with one another for enhanced manufacturing throughput and efficiency.

As indicated by blocks 108 and 110 in FIG. 2, controller 40 receives digital files from users 44, 46, the digital files containing different objects to be generated in the different virtual build beds 28, 30 assigned to users 44, 46, respectively. In one implementation, each user 44, 46 may fill the user's virtual build bed with multiple objects for being generated. Filling of a virtual build bed may be carried out at the control panel of AM unit 224, using an embedded web server of unit 224 or using a software tool that uses a unit interface.

In one implementation, ownership module 272 directs processor 264 to store the shape and dimensions of the user's virtual build bed for future reuse. In one implementation, ownership module 272 directs processor 264 to store both the shape and dimensions of the user's virtual build bed and the contents of the virtual build bed, each of the objects which fill the user's virtual build bed. As a result, the user may quickly retrieve a previous virtual build bed and its contents for reuse and future reproduction of objects contained within the virtual build bed. In one implementation, the virtual build bed and its contents are stored permanently or are stored for a predefined duration. For security and privacy purposes, in one implementation, content of each virtual build bed is encrypted, wherein the AM unit decrypts the content prior to object generation.

In one implementation, controller 40 provides each user 44, 46 with the option of renting, subleasing, selling or otherwise transferring portions of their acquired virtual build bed to yet other users. In such an implementation, controller 40, upon receiving instruction and authorization from a user, partitions the original virtual build bed previously assigned to the user into additional sub virtual build beds contained in the original virtual build bed. In one implementation, the partitioned sub virtual build beds are then assigned to the additional users, such as different sublessors of the manufacturing or building space of the original virtual build bed.

In one implementation, controller 40 directs AM unit 24 to generate the objects defined or described in the digital files in the virtual build beds that are part of the same virtual build bed 26 in the same the same build cycle. As noted above, in one implementation, controller 40 digitally slices the digitally represented objects into layers and controls selective solidification of build material within build bed 26, layer by layer, to form the different objects in the virtual build beds of the same build cycle. In many circumstances, slices or layers of different objects contained in the same virtual build bed or contained in different virtual build beds may be solidified or otherwise generated from the same layer of build material extending across build bed 26. Because system 20 partitions the one single volume of AM build bed 26 during a single build cycle into multiple virtual build beds and assigns such virtual build beds to different users, the total volume of AM build bed 26 may be more completely utilized during each build cycle to enhance AM unit throughput and efficiency.

Figure 4:
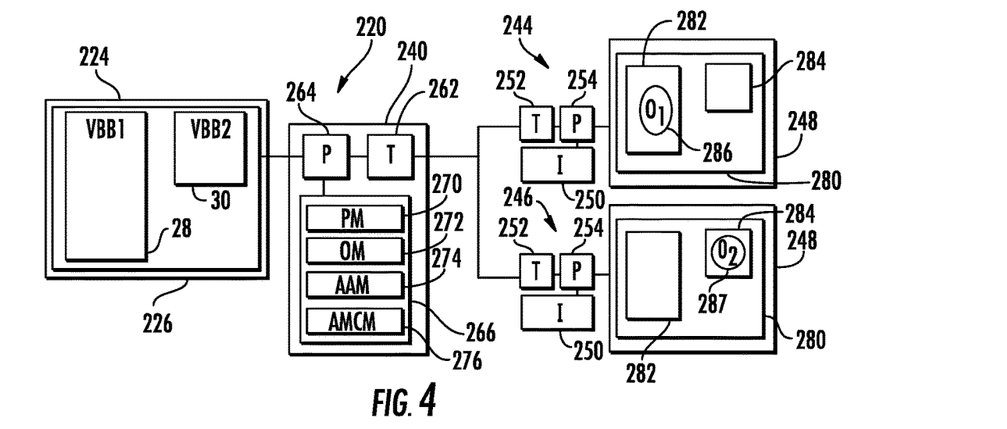
FIG. 4 is a schematic diagram of another example additive manufacturing system in a first mode of operation.
Figure 5:
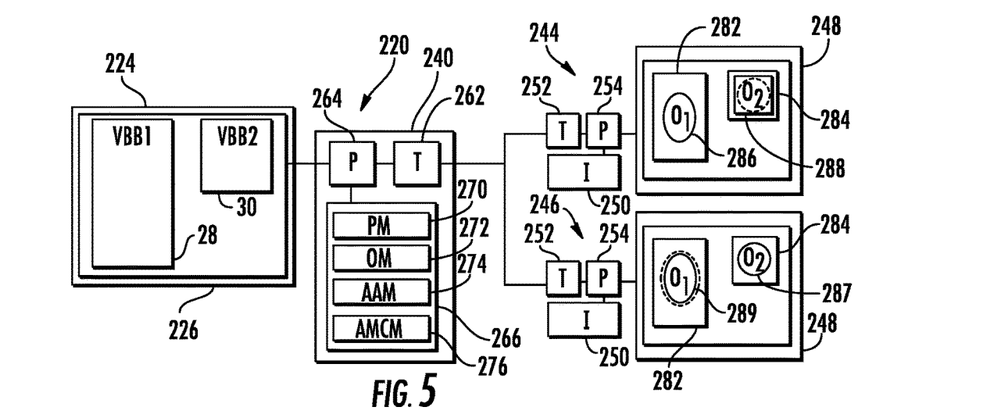
FIG. 5 is a schematic diagram of the AM system of FIG. 4 in a second mode of operation.
Figure 6:
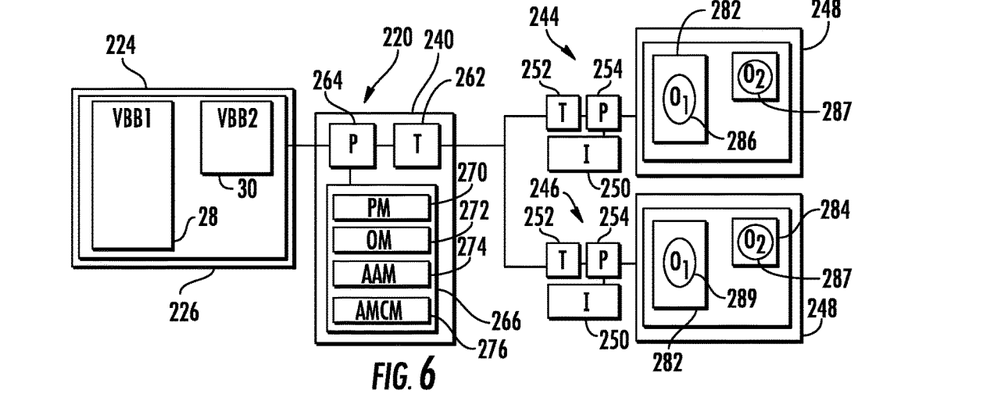
FIG. 6 is a schematic diagram of the AM system of FIG. 4 in a third mode of operation

FIG. 4 illustrates AM system 220, an example implementation of AM system 20. FIGS. 4-6 illustrate AM system 220 in different operational modes. FIG. 4-6 illustrate system 220 interacting with two different example users 244, 246. Each of the users 244, 246 comprises a person or entity that interacts with system 220 using a display 248, an input device 250, a transceiver 252 and a processor 254. In other circumstances, each of user 244, 246 interacts with system 220 using other communication, display and input devices. In other implementations, more than two different users interact with system 220.

Display 248 comprises a display screen or monitor. As will be described hereafter, displays 248 facilitate the presentation of virtual build beds to users 244, 246. Input devices 250 comprise devices by which commands, selections and/or data is input by such users. In one implementation, input devices 250 comprise a keyboard, a touchpad, the touchscreen incorporated as part of display 248, a mouse, a stylus, a microphone with associated speech recognition software and the like. As will be described hereafter, input 250 facilitates the input of selections, modifications to virtual build beds or modifications to objects to be printed within such virtual build beds.

Transceivers 252 facilitate communication between each of users 244, 246 and controller 240 of system 220. In one implementation, transceivers 252 facilitate communication across a local area network or a wide area network. In some implementations, transceivers 252 are omitted, wherein modifications, selections are commands are submitted directly to controller 240.

Processor 254 comprises a processing unit that executes instructions contained on a non-transitory computer-readable medium to direct the display of virtual build beds and objects to be printed upon display 248. Processor 254 further receives inputs or commands through input 250. Processor 254 utilizes transceiver 252 to communicate with system 220, transmitting digital files of objects to be generated to system 220 and receiving data indicating virtual build bed properties and current properties of objects to be generated.

AM system 220 comprises AM unit 224 and controller 240. AM unit 224 is similar to AM unit 24 described above. AM unit 224 (schematically shown) comprises a device which forms parts or objects through an additive process. AM unit 224 comprises an AM build bed 226 that comprises a workspace or build volume in which parts or objects are built or formed in an additive fashion. In one implementation, bed 226 comprises a continuous uninterrupted volume containing a build material, such as a powder build material, which is selectively solidified, layer by layer, to additively build or generate three dimensional parts or objects. After a first layer of the part or object has been built or generated, the AM build bed is lowered and a new layer of build material, such as powder, is provided above the uppermost first layer of the part or object, wherein the new layer of build material is then selectively solidified and joined to the previous uppermost first layer of the part or object. In one implementation, such solidification is carried out through a laser sintering process in which a laser or more than one laser is selectively applied to the build material within bed 26 to melt and fuse the build material, layer by layer, into a solid structure forming the part or object being generated. In another implementation, catalyst, reactant or adhesive is selectively applied, such as with any inkjet printer, to the build material to convert the build material, layer by layer, into a solid structure forming the part or object being generated. In another implementation, an energy absorbing agent is printed on the build material, such as a powder, wherein energy is applied to the build material and energy absorbing agent to selectively solidify, layer by layer, portions of the build material into a solid structure based upon the distribution of the energy absorbing agent. In yet other implementations, solidification of the build material may be carried out, layer by layer, using other solidification technologies.

In yet other implementations, AM unit 224 forms three-dimensional objects or parts using other additive processes or technologies. For example, in other implementations, in lieu of selectively solidifying the build material or powder to form adjacent layers to form a three-dimensional part of product, wherein the un-solidified build material or powder serves as a support for any overlying solidified layers, sacrificial layers may be formed or printed so as to support subsequently formed and overlying non-sacrificial layers. Such sacrificial layers may be formed from materials that are subsequently easily separated, removed or chemically dissolved from the non-sacrificial layers which form the final part or object.

Controller 240 comprises a processing unit and associated program logic which direct the allocation of print jobs to AM build bed 226. In one implementation, controller 240 directs allocation of print jobs amongst a fleet of AM units and build beds. In one implementation, controller 240 additionally directs the operation of AM unit 224. In implementations where parts or objects are formed by selectively solidifying build material within bed 226, controller 240 may additionally direct the supply and distribution of the build material and directs the selective solidification of portions of the build material, layer by layer, to form the parts or objects being printed.

In the example illustrated, controller 240 comprises transceiver 262, processor 264 and memory 266. Transceiver 262 comprise a communication device to facilitate bidirectional communication between controller 240 and each of users 244, 246. In the example illustrated, transceiver 262 facilitates communication with users 244, 246 via transceivers 252 across a local area network or a wide area network. In some implementations, wherein display 248 and input 250 are part of system 220, transceiver 262 is omitted.

Processor 264 comprises a processing unit to carry out instructions provided by program logic stored in memory 266. Memory 266 comprises a non-transitory computer-readable medium. Although memory 266 is illustrated as being consolidated at controller 240, in other implementations, memory 266 is distributed amongst different locations which are accessible across a local area network or wide area network. Memory 266 comprises program logic modules that direct the operation of processor 264 and system 220. In the example illustrated, memory 266 stores partition module 270, ownership module 272, access authorization module 274 and additive manufacturing control (AMC) module 276.

Partition module 270 and ownership module 272 directs processor 264 to carry out method 100 described above with respect to FIG. 2. Partition module 270 directs processor 264 to partition or divide the working or build volume of printer build bed 226 into virtual build beds 28, 30 as described above. Ownership module 272 assigns a form of ownership to virtual build beds 28, 30 to different users, such as users 244, 246. Such ownership may take the form of a lease or rental of the space of the particular virtual build bed 28, 30 during a single build cycle or multiple build cycles. Each of the users assigned ownership of the different virtual build beds transmit or upload digital files representing different objects for generation in their respective virtual build beds during the same build cycle or during the same build cycles.

AMC module 276 directs processor 264 to receive such digital files and manipulate such digital files in preparation for generating the associated objects in the particular virtual build beds. As noted above, in one implementation, AMC module 266 digitally slices the digital objects into multiple layers and thereafter directs processor 264 to output control signals controlling the selective formation of the multiple layers to form the different object being printed. In one implementation, AMC module 266 directs processor 264 in the output of control signals which cause raw print materials, such as a powder, within build bed 226 to be selectively solidified, layer by layer, to form the objects.

In addition to receiving digital files representing objects to be printed and carrying out the printing of such objects in the different virtual build beds, system 220 facilitates user involvement in the three-dimensional printing process. Access authorization module 274 comprises program logic stored in memory 266 which allows different users to view the partitioning of the printer build bed 226 into virtual build beds, allowing different users to view how their respective objects to be printed fill their virtual build bed and the larger build bed and allowing her facilitating collaboration of users with one another, all while addressing privacy or confidentiality concerns. In the example illustrated, access authorization module 274 directs processor 264 and controller 240 in carrying out the example method 300 outlined in FIG. 7.

Figure 7:
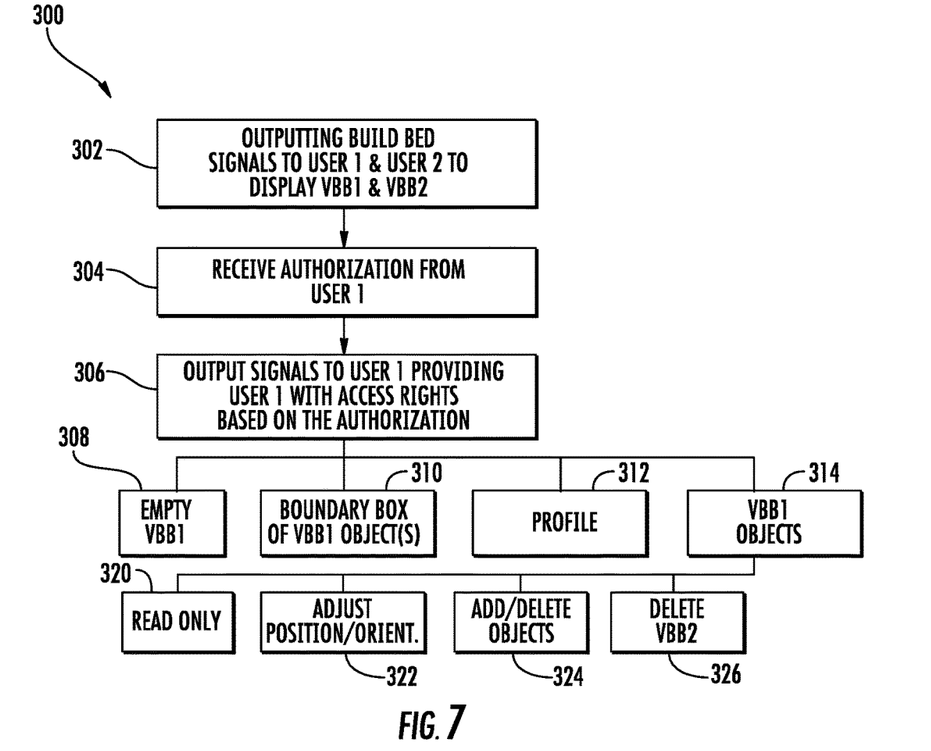
FIG. 7 is a flow diagram of another example AM method.

As indicated by block 302 in FIG. 7, access authorization module 274 directs processor 264 to output AM build bed signals to users 244, 246 so as to display virtual build beds 28, 30 on displays 248 of users 244 and 246. In the example illustrated, such signals result in a visual depiction 280 of build bed 226 on each of displays 248 and further result in visual depictions 282 and 284 of virtual build beds 28, 30 within the visual depictions 280 of virtual build bed 226. As a result, users 244 and 246 are presented with a visual depiction of the partitioning of build bed 226 into virtual build beds. Users 244 and 246 may use information to assess the percentage of utilization of printer build bed 226 and to use such information to acquire or request additional volume within build bed 226, if desired.

As indicated by block 304 of FIG. 7, access authorization module 274 directs processor 264 to prompt for, request or otherwise acquire authorization from one or both of users 244, 246. Such authorization may be received in the form of a keyword, password or other code input through input 250 or through a touchscreen icon of displays 248. In some implementations, such authorization may be received in the form of a scanned or captured authorization key, such as contained on an authorization card, biometric scanner or the like. In one implementation, user authentication and access authorization may be done by 3rd party services. In one mode of operation, the authorization is provided or input by an access requesting user to gain certain access rights to the content of the other user's virtual build bed. In another mode of operation, an access granting user having ownership of a virtual build bed may input the access granting user's authorization for the other receiving user to receive certain access rights with respect to the virtual build bed owned by the access granting user.

As indicated by block 306, access authorization module 274 outputs signals to each processor 254 of each user 244, 246, providing each particular user with access rights with respect to the virtual build bed of the other user 244, 246 based upon any received authorization or lack thereof. Blocks 308-314 illustrate different example levels of access rights that may be provided by access authorization module 274 based upon the received authorization from an access granting user or an access receiving user. As indicated by block 308 and illustrated in FIG. 4, in a first mode of operation, neither of users 244, 246 has granted the other of users 244, 246 with any access rights to the content of the owned virtual build better beds and neither of users 244, 246 has provided proper authorization for gaining access to the content of the virtual build bed or beds of the other of users 244, 246. As a result, the content of just the virtual build bed 282 owned by the first user 244, the depiction 286 of object 1, is presented on display 248 of the first user 244. Likewise, the content of just the virtual build bed 284 owned by the second user 246, the depiction 287 of object 2, is presented on display 248 of the second user 246. In effect, authorization access module 274 filters out or prevents unauthorized users from seeing or viewing the contents of virtual build beds to which the unauthorized users have no rights, preserving privacy or confidentiality of such contents.

In some circumstances, it may be desirable for one user to visibly ascertain the extent to which the virtual build bed owned by another user is being utilized. As indicated by block 310 and as illustrated by FIG. 5, in a second mode of operation, access authorization module 274 provides limited access to the virtual build bed of another user, allowing the user who does not own the virtual build bed to view a boundary box of any objects within the other user's virtual build bed. In such an implementation, based upon received authorizations, access authorization module 274 generates a boundary box having a generic shape that closely conforms to the maximum dimensions of the collection of objects in the other user's virtual build bed (in a first mode) and/or a generic shape boundary box for each individual object in the other user's virtual build bed.

The boundary box may have the generic shape of a rectangular box, a spherical box, a pyramid shaped box, a polygonal shaped box or any one of other various generic shapes which indicate the maximum dimensions of the object or group of objects in each of the X, Y and Z dimensions without necessarily indicating the exact detail or shape of the object or objects contained in the box. Such a boundary box allows a user to visibly ascertain and extent to which the other user is utilizing the other virtual build bed without being able to visibly ascertain details regarding the object or objects which are to be generated in the other virtual build bed.

As indicated by block 312, in yet a third mode of operation, access authorization module 274 provides a level of access that allows one user to view a profile of each of the objects to be printed within the virtual build bed of the other user. A profile comprises an outline of an object to be printed. In contrast to a boundary box of an object which indicates just maximum dimensions of the object, an outline of an object identifies particular details regarding the actual outer shape of a perimeter of the object. As a result, the outline of the object is likely to reveal the general nature or outer configuration of the object. In contrast to a detailed depiction of the object, the outline of the object may not reveal interior cavities, undercuts and other interior details.

In the example shown in FIG. 5, user 244 has acquired access rights that permit user 244 to see or view an example boundary box 288 within the depiction 284 of the virtual build bed 30 owned user 246. As indicated by broken lines, access authorization module 274 restricts or limits the access of user 244 such that user 244 cannot see the details of the object 2 which is to be generated within virtual build bed 30 of user 246. At the same time, in the example shown in FIG. 5, access authorization module 274 has received authorization such that user 246 has acquired greater access rights that allow user 246 to view a profile 289 of each of the objects in the virtual build bed owned by the other user 244. In the example illustrated, access authorization module 274 outputs signals such that display 248 of user 246 presents profile 289 of the object 1 to be printed within the virtual build bed 28 owned by user 244.

As indicated by block 314, in yet a fourth mode of operation, access authorization module 274 provides a level of access in which all of the details of the objects in the virtual build bed of one user are presented or displayed to another user. In the example illustrated in FIG. 6, access authorization module 274 directs processor 264 to output signals to the process 254 of users 244 and 246 such that user 244 and 246 may view complete detailed depictions 287 and 286 on their respective displays 248, respectively. Because with appropriate credentials or authorizations, access authorization module 274 provides user 244 with complete detailed viewing of the object or objects to be printed in the virtual build bed 30 of user 246 and because access authorization module 274 provides user 266 with complete detailed viewing of the object or objects to be generated in the virtual build bed 28 of user 244, collaboration between uses 244 and 246 is facilitated. For example, users 244 and 246 may collaborate to ensure that the respective parts are usable with one another during ongoing development. Although FIG. 6 illustrates an example mode of operation in which both user 244, 246 have full viewing rights of the objects of the other to be printed, in other modes of operation, use 244, 246 may have different levels of access or authorization. For example, two users within an organization may have different levels of access to the virtual build beds of the other. For example, access authorization module 274 may receive authorizations or credentials such that a manager has complete viewing details for all of the objects in all of the virtual build beds for users within an organization while individual engineers or department heads are provided with lesser levels of authorization allowing such individuals or entities to view some, but not all, virtual build beds of different users within the organization.

As indicated by blocks 320-326, access authorization module 274 is further operable in additional modes in which users given complete viewing details per block 314 are provided with different levels of interaction access. As indicated by block 320, a user giving full viewing access of an object or objects contained in a virtual build bed may be restricted to read only interact with such objects contained in the virtual build bed. As indicated by block 322, upon receipt of appropriate authorization or credentials, access authorization module 274 alternatively provides a user with interactive rights which allow a user to adjust a positioning and/or orientation of the object in its virtual build bed. As indicated by block 324, upon receipt of appropriate authorization or credentials, access authorization module 274 alternatively or additionally provides a user with interactive rights which allow a user to add or objects to a virtual build bed. As indicated by block 326, upon receipt of appropriate authorization or credentials, access authorization module 274 alternatively or additionally provides a user with interactive rights which allow a user to remove a virtual build bed from a build cycle. In still other implementations, additional interactive rights or levels of interactive access may be provided to a user by access authorization module 274 based upon authorization or credentials for a user.

In addition to facilitating use of printer build bed 226 of a single build cycle by multiple users, AM system 220 facilitates partitioning of build bed 226 into additional virtual build beds and adding additional objects to be generated to build bed 226 after generation of an object or more than one objects in the same build bed 226 for the same build cycle has already begun. As a result, system 220 allows the printing of objects that are added late, after printing is begun, to enhance utilization of the total available space of build bed 226. System 220 facilitates a higher utilization of build bed 226 by allowing virtual build beds and the objects within such virtual build beds to be stacked upon virtual build beds containing objects for which object generation or printing has already begun.

Figure 8:
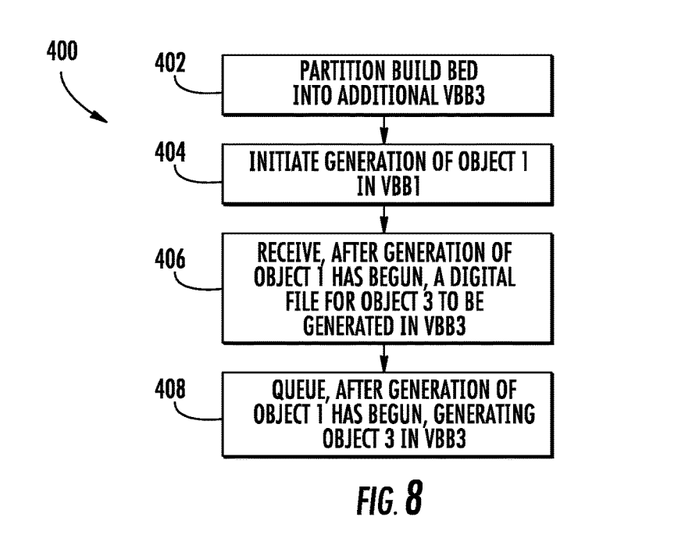
FIG. 8 is a flow diagram of another example AM method.
Figure 9:
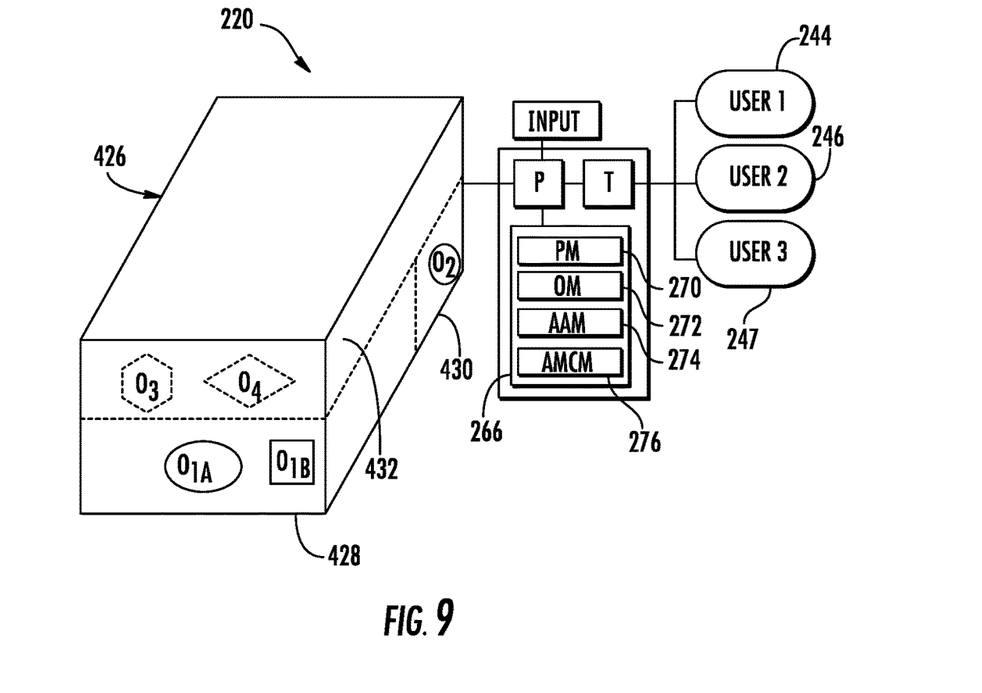
FIG. 9 is a schematic diagram of the AM system of FIG. 4 performing the method of FIG. 8.

FIG. 8 illustrates an example method 400 for enhancing utilization of the three-dimensional printer build bed 426. FIG. 9 illustrates the method of 8 being carried out. FIGS. 8 and 9 illustrate an example scenario in which the generation of objects O1A, O1B and O2 in the virtual build beds 428, 430, owned by users 244 and 246, respectively, has already begun and in which build bed 426 contains unused space above the virtual build beds 428, 430. In the example scenario illustrated in FIG. 8, a third user 247 (shown in FIG. 9) desires to build third and fourth three-dimensional objects O3 and O4.

As indicated by block 402 of FIG. 8, partitioning module 270 directs processor 26 to partition build bed 426 into an additional virtual build bed 432. Virtual build bed 432 extends above virtual build beds 428, 430 such that layers of build material have not yet been solidified within virtual build bed 432. Ownership module 272 assigns ownership of the newly created virtual build bed 432 to user 247.

In one implementation, the partitioning of build bed 426 is carried out after objects are received or submitted from user 247, wherein partitioning module 270 partitions bed 426 such that the volume and configuration of virtual build bed 432 is sufficiently large to contain the objects for which generation is requested by user 247. In circumstances where, after comparing the proposed objects and the remaining space available within build bed 426, the remaining space within build bed 426 is not sufficiently large for generating each of the objects proposed by user 247, system 220 informs user 247 that build bed 426 cannot be partitioned to a volume or shape sufficient to generate the object or objects proposed by user 247 or that user 247 should modify the number of objects or the set of objects proposed by user 247 for being generated in the remaining space of build bed 426 during the ongoing build cycle.

As indicated by block 404 in FIG. 8, AMC module 276 initiates printing of the objects in the virtual build beds 428, 430, at least one of which underlies the newly added third virtual build bed 432. In one implementation, partitioning of build bed 426 into additional virtual build bed 432 in block 402 occurs prior to the initiation of the generation of the object or objects contained in virtual build beds 428, 430. In yet another implementation, partitioning of build bed 426 in block 402 occurs after the generation of the object or the generation of the objects contained in virtual build beds 428, 430 has begun.

As indicated by block 406 in FIG. 8, system 220, shown in FIG. 9, receives a digital file for an object or more than one object to be generated within the newly added third virtual build bed 432. The digital file for the object or objects to be generated within virtual build bed 432 is received after generation of at least one object within at least one of the underlying virtual build beds 428, 430 has begun. AMC module 276 digitally slices the object or objects contained in the digital file received from user 247 and places the printing of the object or objects received from user 247 in queue for subsequent printing in virtual build bed 432. Once the objects within virtual build beds 428, 430 have been printed, AMC module 276 continues, within the same build cycle, by printing objects O3 and O4 receive from user 247 within virtual build bed 432 above at least one of virtual build beds 428, 430.

Figure 10:
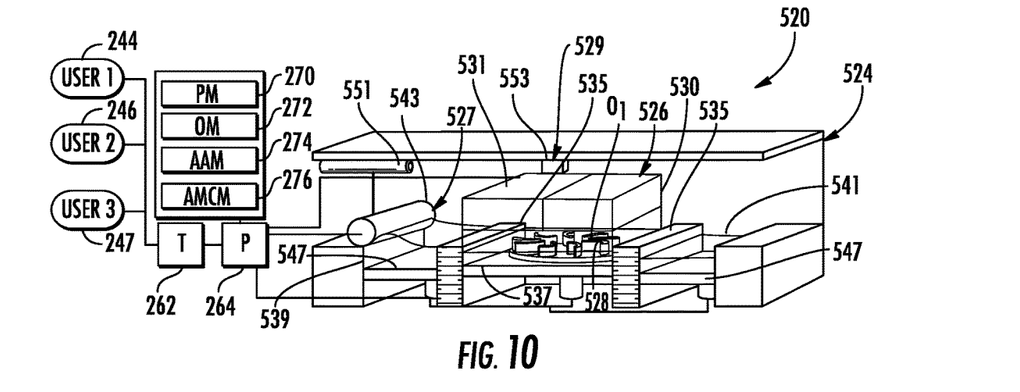
FIG. 10 is a schematic diagram of another example AM system during a first stage of an additive manufacturing operation.
Figure 11:
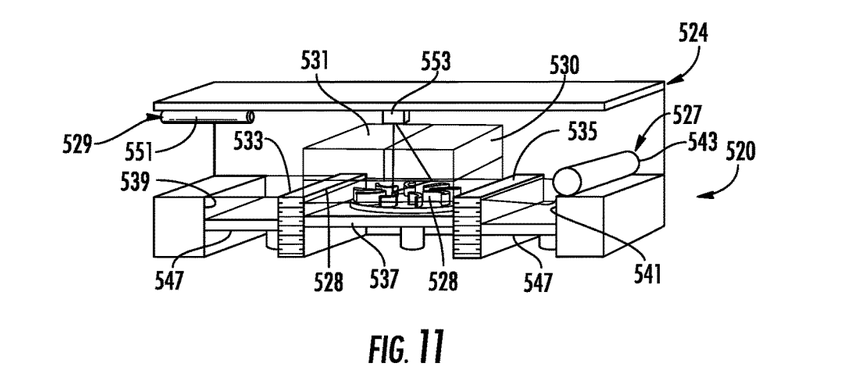
FIG. 11 is a schematic diagram of the AM system of FIG. 10 during a second stage of the additive manufacturing operation.
Figure 12:
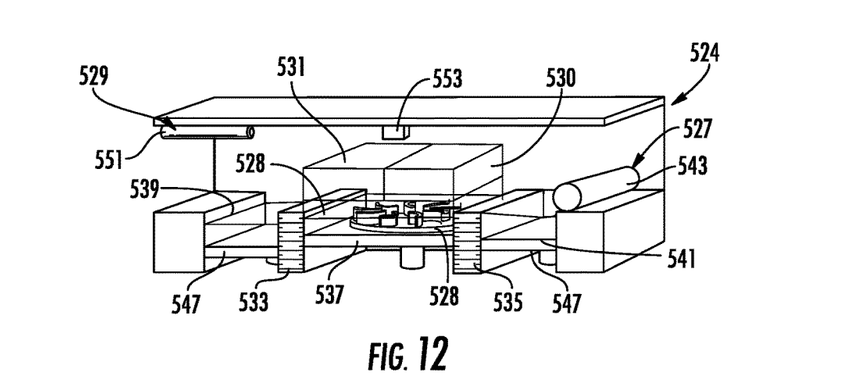
FIG. 12 is a schematic diagram of the AM system of FIG. 10 during a third stage of the additive manufacturing operation.

FIG. 10 illustrates three-dimensional printing system 520, an example implementation of three-dimensional printing systems 20 and 220 described above. FIGS. 10-12 illustrate three-dimensional printing by printing system 520. AM system 520 is similar to AM system 220 except that system 520 is specifically illustrated as comprising additive manufacturing unit 524 in lieu of the above schematically illustrated unit 224. Those remaining components or elements of system 520 which correspond to components of system 220 are numbered similarly.

AM unit 524 comprises build bed 526, building material supply and distribution system 527 and building material solidifier 529. Build bed 526 comprises a volume to contain a build material, such as a powder matrix, as portions of the powder matrix are solidified, layer by layer, to form a three-dimensional object within the powder matrix. Build bed 526 comprises sidewalls 533, 535 and floor 537. In the example illustrated, floor 537 comprises a movable platform to be raised and lowered by an actuator under the control of processor 264. In other implementations, floor 537 is stationary while sidewalls 533, 535 are vertically movable by an actuator under control of processor 264. In the example illustrated, floor 537 is sequentially lowered by a predefined distance, substantially equal to a predefined thickness of build material which is to form the next layer of the three-dimensional object being generated.

Building material supply and distribution system 527 supplies build material to build bed 526. System 527 supplies printing material over and above a previously formed and solidified layer of the three-dimensional object being formed. In the example illustrated, system 527 comprises build material supply bins 539, 541 and roller 543. Each supply bin 539, 541 contains a supply of the build material, such as a powder matrix. Each supply bin 539, 541 comprises an underlying piston or platform 547 which is selectively raised and lowered to raise an amount of build material above one of sidewalls 533, 535 such that roller 543 may push the contained printing material over sidewalls 533, 535 into and across build bed 526, above the previously formed solidified layers of the object or objects being generated within bed 526.

Solidifier 529 comprises a device to selectively solidify portions of the build material within bed 526, layer upon stacked layer, to form three-dimensional object or objects being generated. In the example illustrated, solidifier 529 is part of a laser sintering AM unit in which a laser source 551 is controlled by processor 264 to emit one of more lasers which are reflected by mirror system 553 onto selected portions of the build material within bed 526. In other implementations, solidifier 529 selectively ejects or emits a solidifying substance, such as adhesive, epoxy, chemical catalyst or the like which causes selected portions of the build material within bed 526 to be solidified. For example, in one implementation, solidifier 529 comprises an inkjet printer that selectively prints or ejects an adhesive onto the build material contained within bed 526 to form a layer of the three-dimensional object or objects being generated. In yet another implementation, an energy absorbing agent is printed on the build material, such as a powder, wherein energy is applied to the build material and energy absorbing agent to selectively solidify, layer by layer, portions of the build material into a solid structure based upon the distribution of the energy absorbing agent.

FIGS. 10-12 illustrate generation of three-dimensional objects by AM system 520. For ease of illustration, FIGS. 10 and 11 only illustrate AM unit 524. As shown by FIG. 10, partitioning module 270 has partitioned the build bed 526 into three example virtual build beds 528, 530, 531. Ownership module 272 has assigned ownership of virtual build beds 528, 530 and 531 to users 244, 246 and 247. Upon such partitioning, access authorization module 274 causes processor 264 to output signals which result in each user 244, 246, 247 being presented with a visible depiction of the virtual build bed owned by each user. In one implementation, the presentation of the visible depiction of the virtual build bed occurs on a website hosted by a supplier of AM system 520. In one implementation, the output signals further result in each user 244, 246, 247 being presented with an outline of the virtual build beds owned by the other users in the same build cycle. In one implementation, depending upon authorization of each user as determined by access authorization module 274, such users may view and possibly modify the contents of the virtual build beds of the other users.

Each user, being able to view its owned virtual build bed, may then fill or occupy the virtual build bed it owns with content, one or more objects to be generated within the virtual build bed. Each user may orient multiple objects within the virtual build bed it owns to maximize utilization of the virtual build bed. In some implementations, such as where multiple users have access rights to each other's virtual build beds such as described above with respect to blocks 322, 324 and 326 of FIG. 7, multiple users may collaborate with one another to develop objects and locate or position objects within each virtual build bed.

Once AMC module 276 has received an indication from a user that submission of the object or objects by the user for manufacture are complete and final, AMC module 276 digitally slices the received objects for generation. Once at least the lowermost virtual build bed 528 has been authorized for generation, AMC module 276 initiates printing of the object or objects which user 244, the owner of virtual build bed 528, has placed within virtual build bed 528. As shown by FIGS. 10 and 11, platform 547 of the left bin 539 is raised to push build material above the left side wall 533. AMC module 276 directs processor 264 to output signals causing actuator to move spreader 543, shown as a roller, to the right so as to push and distribute build material over the left wall 533 across build bed 526 and above the previously solidified layer. Any excess material is deposited in bin 541, for which platform 547 is lowered.

As shown by FIG. 11, AMC module 276 directs processor 264 to output control signals causing solidifier 529 to selectively solidify portions of the build material within build bed 526. In the example illustrated, processor 264 directs solidifier 529 to selectively apply a laser which sinters, melts or fuses the build material. As shown by FIG. 12, once solidification of the new layer has been completed, processor 264 outputs control signals causing the platform of virtual build bed 526 to lower, the platform 547 of bin 539 to lower and the platform 547 of bin 541 to rise so to push build material to a height above the top of the right most side wall 535. Thereafter, AMC module 276 directs processor 264 to output signals causing spreader 543 to return, moving back to the right, so as to push build material over the right side wall 535 and on top of the previous solidified layer within build bed 526. Excess build material is deposited within bin 539. The steps illustrated in FIGS. 10, 11 and 12 or repeated, layer by layer, until each of the objects in each of the virtual build beds 528, 530, 531 has been completed. Thereafter, the completed objects are removed from any remaining unused or un-solidified build material within virtual build bed 526.

As noted above, in one implementation, system 520 allows users 246 and 247 to continue to submit objects for generation or to continue to work on or modify objects to be generated within the virtual build beds 530, 531, which overlie virtual build bed 528, after generation of objects in virtual build bed 528 has already begun. Although build bed 526 is illustrated as being partitioned into three virtual build beds which are each rectangular in shape, in other implementations, build bed 526 may alternatively be partitioned into other numbers of virtual build beds, wherein each virtual build bed may have other shapes. Although distribution system 527 is illustrated as spreading build material over and across build bed 526 after each layer has been solidified, in other implementations, distribution system 527 alternatively deposit, spray, drop, unload or apply build material on top of a previously solidified layer in other manners.

While examples have been illustrated and described, it will be appreciated that various changes can be made therein without departing from the spirit and scope of the disclosure. For example, although different examples may have been described as including one or more features providing one or more benefits, it is contemplated that the described features may be interchanged with one another or alternatively be combined with one another in the described examples or in other alternative implementations. One of skill in the art will understand that the above described additive manufacturing system may also be practiced without many of the details described above. Accordingly, it will be intended to include all such alternatives, modifications and variations set forth within the spirit and scope of the appended claims. Further, some well-known structures or functions may not be shown or described in detail because such structures or functions would be known to one skilled in the art. The terminology used in the present specification is intended to be interpreted in its broadest reasonable manner in light the specification as would be understood by those of ordinary skill the art.

What is claimed is:

1. A method comprising:
partitioning a build bed of an additive manufacturing (AM) system into a first virtual build bed and a second virtual build bed;
assigning the first virtual build bed to a first user;
assigning the second virtual build bed to a second user;
receiving, from the first user, a first digital file for a first object to be generated in the first virtual build bed; and
receiving, from the second user, a second digital file for a second object to be generated in the second virtual build bed during a same build cycle in which the first object in the first virtual build bed is generated, wherein the first virtual build bed and the second virtual build bed are assigned to the first user and the second user, respectively, prior to the receiving of the first digital file or the receiving of the second digital file.

2. The method of claim 1 further comprising:
outputting AM build bed signals to the first user and to the second user to display the first virtual build bed and the second virtual build bed forming the AM build bed;
outputting first object signals to the first user to display the first object in the first virtual build bed being displayed; and
outputting second object signals to the second user to display the second object in the second virtual build bed being displayed, wherein the second virtual build bed displayed to the first user does not contain the second object and wherein the first virtual build bed displayed to the second user does not contain the first object.

3. The method of claim 2 further comprising:
outputting first outline signals to the first user to display an outline of the second object in the second virtual build bed being displayed; and
outputting second outline signals to the second user to display an outline of the first object in the first virtual build bed being displayed.

4. The method of claim 3, wherein the outline of the first object comprises a boundary box of the first object.

5. The method of claim 1 further comprising:
outputting AM build bed signals to the first user and to the second user to display the first virtual build bed and the second virtual build bed forming the AM build bed;
receiving an authorization for the second user; and
outputting signals to the second user to display different levels of detail regarding the first object in the first virtual build bed being displayed to the second user based upon the authorization.

6. The method of claim 1 further comprising:
receiving an authorization for the second user; and
providing the second user with different access rights regarding the first object in the first virtual build bed being displayed based on the authorization.

7. The method of claim 1 further comprising:
partitioning the AM build bed into an additional third virtual build bed;
initiating generation of the first object in the first virtual build bed;
receiving, after generation of the first object has been initiated, a digital file for a third object to be generated in the AM build bed; and
queuing, after generation of the first object has been initiated, generating the third object in the third virtual build bed of the AM build bed.

8. The method of claim 1 further comprising:
receiving a third digital file for a third object from a third user;
determining a minimum size for a third virtual build bed to contain the third object;
receiving signals indicating available volume in the AM build bed and available volume in a second AM build bed;
comparing the minimum size for the third virtual build bed to the available volume in the AM build bed and the available volume in the second AM build bed;
partitioning one of the AM build bed and the second AM build bed to additionally include the third virtual build bed based upon the comparison; and
forwarding the third digital file for the third object to the third virtual build bed for generation in the third virtual build bed.

9. An apparatus comprising:
an additive manufacturing (AM) system having a build volume for a build cycle;
a controller to partition the build volume for the build cycle into first and second sub volumes for the build cycle and to assign ownership of the first and second sub volumes for the build cycle to first and second users, respectively, wherein the first virtual build bed and the second virtual build bed are assigned to the first user and the second user, respectively, prior to the receiving any digital file for objects to be built during the build cycle in either of the first and second sub volumes.

10. The apparatus of claim 9, wherein the controller provides different access rights to the different users based upon different authorizations of the different users.

11. The apparatus of claim 9, wherein the controller displays different levels of detail for different objects to be generated in the different sub volumes to a viewer based upon authorization of the viewer.

12. The apparatus of claim 9, wherein the controller is to occupy one of the different sub volumes of the build cycle that has available space with an object to be generated after initiation of object generation in the build volume for the build cycle.

13. An apparatus comprising:
non-transitory computer-readable medium containing program logic to direct a processor to:
partition an additive manufacturing (AM) build bed of an additive manufacturing unit into a first virtual build bed and a second virtual build bed for a build cycle prior to receiving any digital file for objects to be built in the first virtual build bed or the second virtual build bed during the build cycle;
assign the first virtual build bed to a first user;
assign the second virtual build bed to a second user;
receive a first digital file for a first object to be generated in the first virtual build bed from the first user; and
receive a second digital file for a second object to be generated in the second virtual build bed from the second user; and
output signals to the AM unit to print the first object in the first virtual build bed and the second object in the second virtual build bed during a single build cycle.

14. The apparatus of claim 13, wherein the program logic is further to direct the processor to:

output AM build bed signals to the first user and to the second user to display the first virtual build bed and the second virtual build bed forming the AM build bed;

receiving an authorization for the second user; and output signals to the second user to display different levels of detail regarding the first object in the first virtual build bed being displayed to the second user based upon the authorization.

15. The apparatus of claim 13, wherein the program logic is further to direct the processor to:

receive an authorization for the second user; and provide the second user with different access rights regarding the first object in the first virtual build bed being displayed based on the authorization.

16. The method of claim 1, further comprising receiving, from the first user, a third digital file for a third object to be generated in the first virtual build bed during the same build cycle in which the first object in the first virtual build bed is generated.

17. The method of claim 1 further comprising:

storing data regarding a shape and dimensions of the first virtual build bed and objects assigned by the first user to be generated in the first virtual build bed during a first build cycle; and partitioning the build bed to include the first virtual build bed during a second build cycle and generating the objects based upon the stored data during a second build cycle.

18. The method of claim 1 further comprising:

defining virtual build beds;

allocating the virtual build beds amongst a plurality of different build cycles for the build bed based upon at least one of a size, shape or configuration of the different virtual build beds.

19. The method of claim 1 further comprising:

receiving a first build time flexibility value from the first user;

receiving a second build time flexibility value from a third user, wherein the partitioning of the build bed into the first virtual build bed that is assigned to the first user is for a first build cycle selected based upon the first build time flexibility value and wherein the build bed is partitioned into a third virtual build bed assigned to the third user for a second build cycle selected based upon the second build time flexibility value.

* * * * *